July 18, 1933.   F. NALLINGER   1,918,659
AIR TEMPERATURE REGULATOR
Filed Jan. 6, 1931
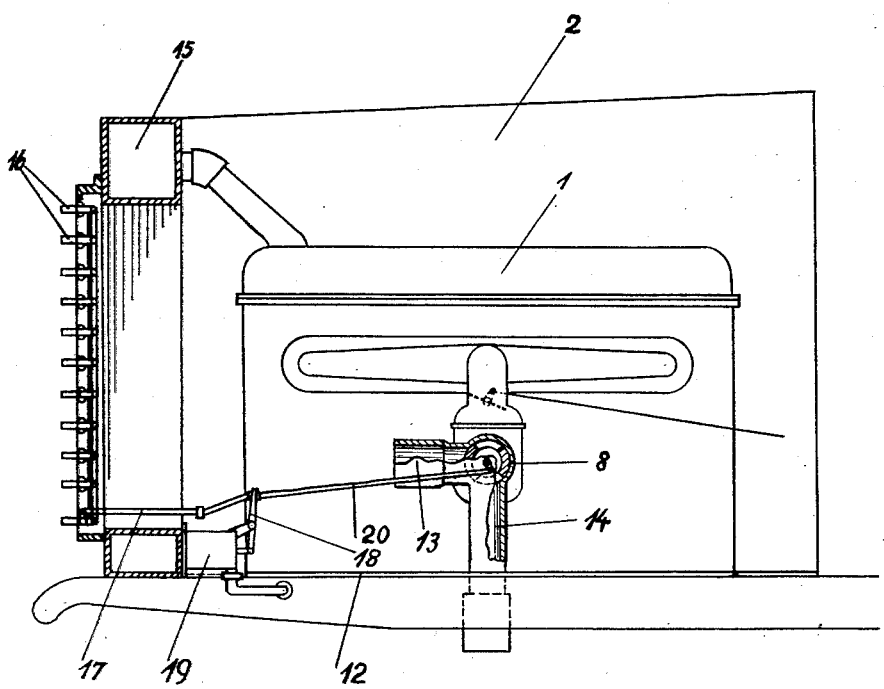
Inventor Patented July 18, 1933

1,918,659

UNITED STATES PATENT OFFICE

FRITZ NALLINGER, OF STUTTGART-UNTERTURKHEIM, GERMANY, ASSIGNOR TO DAIMLER-BENZ AKTIENGESELLSCHAFT, OF STUTTGART-UNTERTURKHEIM, GERMANY, A COMPANY OF GERMANY

AIR TEMPERATURE REGULATOR

Application filed January 6, 1931, Serial No. 507,008, and in Germany January 6, 1930.

This invention relates to an apparatus for automatically regulating the temperature of the air sucked in, in internal combustion engines. For complete combustion and economical operation it is necessary that the temperature of the air should remain between certain limits.

It is known to regulate the temperature of the air which is sucked in by mixing cold air preferably sucked in from the free atmosphere and warm air, for example, sucked in within the motor hood. It is also known to regulate the proportions of warm and cold air by a thermostat.

According to the invention a particularly simple and advantageous regulating apparatus is produced by a thermostat provided on the radiator for adjusting the radiator closing members being attached to the air regulating member or members, the thermostat being intended to control the radiator closing members in such a manner as to secure a constant regulation of the cooling water.

A constructional form of the invention is illustrated by way of example in the accompanying drawing.

The engine 1 is surrounded by the engine hood 2. In order that the air temperature regulation may be carried out effectively the engine space is closed at the bottom, for example, by the sheet metal plate 12. The suction tube is arranged on the carburetter side. The warm air is sucked directly from the space within the engine hood by the tube 13, and the cold air from the free atmosphere through the tube 14. A regulating member 8 is provided at the place where the two tubes, for warm and cold air, meet. This member is constructed, for example, as a rotary slide valve which opens one tube to the same extent as it closes the other. The air flowing in through the radiator 15 is throttled or completely shut off by the closing member 16 when the temperature of the cooling water falls, the closing member 16 being adjusted by the thermostat 19 through the rod 17 and lever 18. The thermostat 19 is provided in the lower part of the radiator and is therefore effected by the temperature of the cooling water. On the lever 18 a further rod 20 is provided which adjusts the regulating member 8 for the cold and warm air. The drawing illustrates the position in which after the highest temperature has been reached in the engine hood the thermostat has fully opened the closing members 16 and has shut off the warm air tube 13, also that the engine only sucks in cold air.

What I claim is:—

1. The combination with an internal combustion engine of a thermostat, radiator closing members adapted to be adjusted by the thermostat and a single regulating member for supplying warm air from the space within the engine hood or cold air from outside this space to the carburetter which is adjusted by the thermostat.

2. The combination of an internal combustion engine, and engine hood, a system for circulating cooling medium, a thermostatic device located in the circulating system, a radiator, means for regulating the flow of air through the radiator interconnected with the thermostatic device, a carburetter, inlet tubes to the carburetter for supplying warm air from within the hood and cool air from without the hood, a regulating member at the junction of the inlet tubes adapted to open one tube as it closes the other and vice-versa, and means for connecting the regulating member to the thermostatic device to be operated thereby in conjunction with the means for regulating the flow of air through the radiator.

FRITZ NALLINGER.